US012670718B2

(12) United States Patent
Peng et al.

(10) Patent No.: US 12,670,718 B2
(45) Date of Patent: Jun. 30, 2026

(54) VEHICLE VIOLATION DETECTION METHOD AND VEHICLE VIOLATION DETECTION SYSTEM

(71) Applicant: National Chengchi University, Taipei City (TW)

(72) Inventors: Yan-Tsung Peng, Taipei City (TW); Chen-Yu Liu, Hsinchu County (TW); He-Hao Liao, Yunlin County (TW); Wei-Cheng Lien, New Taipei City (TW)

(73) Assignee: National Chengchi University, Taipei City (TW)

( * ) Notice: Subject to any disclaimer, the term of this patent is extended or adjusted under 35 U.S.C. 154(b) by 347 days.

(21) Appl. No.: 18/505,141

(22) Filed: Nov. 9, 2023

(65) Prior Publication Data

US 2025/0139978 A1 May 1, 2025

(30) Foreign Application Priority Data

Oct. 27, 2023 (TW) .................................. 112141398

(51) Int. Cl.
*G06V 20/54* (2022.01)
*G06T 7/246* (2017.01)
(Continued)

(52) U.S. Cl.
CPC .............. *G06V 20/54* (2022.01); *G06T 7/248* (2017.01); *G06T 7/55* (2017.01); *G06T 7/74* (2017.01);
(Continued)

(58) Field of Classification Search
CPC ...... G06V 20/54; G06V 10/766; G06V 20/41; G06V 20/625; G06V 2201/08;
(Continued)

(56) References Cited

U.S. PATENT DOCUMENTS

2011/0182473 A1* 7/2011 Wang ..................... G06V 20/54
382/103
2012/0148092 A1 6/2012 Ni et al.
(Continued)

FOREIGN PATENT DOCUMENTS

CN 105070053 11/2015
CN 115601717 A * 1/2023 ............. G06V 20/54
(Continued)

OTHER PUBLICATIONS

An Effective Video Analysis Method for Detecting Red Light Runners (Year: 2001).*
(Continued)

*Primary Examiner* — Chan S Park
*Assistant Examiner* — Emily Rose Hauk
(74) *Attorney, Agent, or Firm* — JCIPRNET

(57) ABSTRACT

A vehicle violation detection method and vehicle violation detection system are provided. The method includes the following steps. A video clip including a plurality of consecutive frames is obtained, wherein the video clip is generated through photographing an intersection by an image capture device. A traffic sign object corresponding to a traffic sign and a license plate object corresponding to a license plate are detected from each of the frames. According to a sign position of the traffic sign object and a plate position of the license plate object in each of the frames, vehicle behavior information of each of the frames is obtained. By conducting regression analysis to the vehicle behavior information of each of the frames, whether a vehicle violation event has occurred is determined.

16 Claims, 7 Drawing Sheets

(51) Int. Cl.

| | |
|---|---|
| *G06T 7/55* | (2017.01) |
| *G06T 7/73* | (2017.01) |
| *G06V 10/766* | (2022.01) |
| *G06V 20/40* | (2022.01) |
| *G06V 20/62* | (2022.01) |

(52) U.S. Cl.
CPC ............ *G06V 10/766* (2022.01); *G06V 20/41* (2022.01); *G06V 20/625* (2022.01); *G06T 2207/10016* (2013.01); *G06T 2207/20081* (2013.01); *G06T 2207/20084* (2013.01); *G06T 2207/30236* (2013.01); *G06T 2207/30241* (2013.01); *G06V 2201/08* (2022.01)

(58) Field of Classification Search
CPC .. G06T 7/248; G06T 7/55; G06T 7/74; G06T 2207/10016; G06T 2207/20081; G06T 2207/20084; G06T 2207/30236; G06T 2207/30241
See application file for complete search history.

(56) References Cited

U.S. PATENT DOCUMENTS

| | | | |
|---|---|---|---|
| 2015/0332097 A1* | 11/2015 | Bulan | G06F 18/24 |
| | | | 382/103 |
| 2021/0181745 A1* | 6/2021 | Liu | G05D 1/0274 |

FOREIGN PATENT DOCUMENTS

| | | |
|---|---|---|
| CN | 116091989 | 5/2023 |
| TW | 201241796 | 10/2012 |

OTHER PUBLICATIONS

Computer Vision and Imaging in Intelligent Transportation Systems Chapter 5: Detection of Moving Violations (Year: 2017).*

Wentong Wu et al., "Application of local fully Convolutional Neural Network combined with YOLO v5 algorithm in small target detection of remote sensing image", PLoS One, Oct. 29, 2021, pp. 1-15.

Nicolai Wojke et al., "Simple Online and Realtime Tracking With a Deep Association Metric", 2017 IEEE International Conference on Image Processing (ICIP), Sep. 17-20, 2017, pp. 3645-3649.

Zhengqi Li et al., "MegaDepth: Learning Single-View Depth Prediction from Internet Photos", 2018 IEEE/CVF Conference on Computer Vision and Pattern Recognition, Jun. 18-23, 2018, pp. 2041-2050.

Yan-Tsung Peng et al., "Traffic Violation Detection via Depth and Gradient Angle Change", 2022 IEEE the 7th International Conference on Intelligent Transportation Engineering, Nov. 11-13, 2022, pp. 326-330.

Jhun-Hsuan Huang, "Relationship between Driver Violation and Traffic Accidents", Master Thesis, Degree Program of Transportation and Logistics College of Management National Chiao Tung University, with English abstract, Jul. 2014, pp. 1-58.

"Office Action of Taiwan Counterpart Application", issued on Jun. 5, 2024, p. 1-p. 5.

* cited by examiner

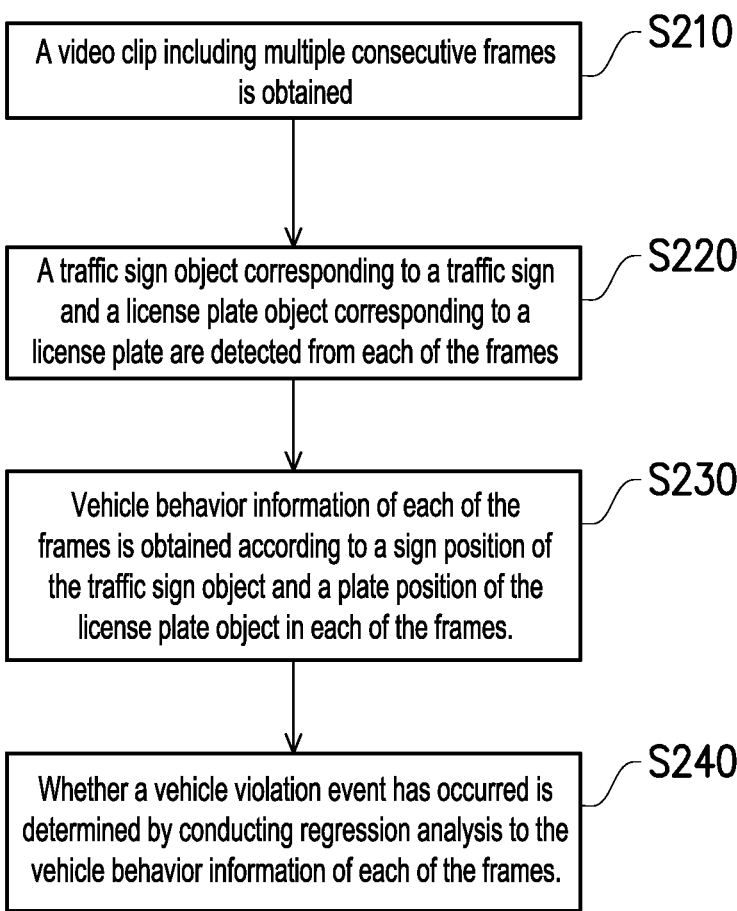

A video clip including multiple consecutive frames is obtained    S210

A traffic sign object corresponding to a traffic sign and a license plate object corresponding to a license plate are detected from each of the frames    S220

Vehicle behavior information of each of the frames is obtained according to a sign position of the traffic sign object and a plate position of the license plate object in each of the frames.    S230

Whether a vehicle violation event has occurred is determined by conducting regression analysis to the vehicle behavior information of each of the frames.    S240

FIG. 2

Regression analysis is conducted according to the vehicle behavior information of multiple frames to generate a coefficient of determination. — S241

Whether a vehicle violation event has occurred is determined according to the coefficient of determination of the regression analysis. — S242

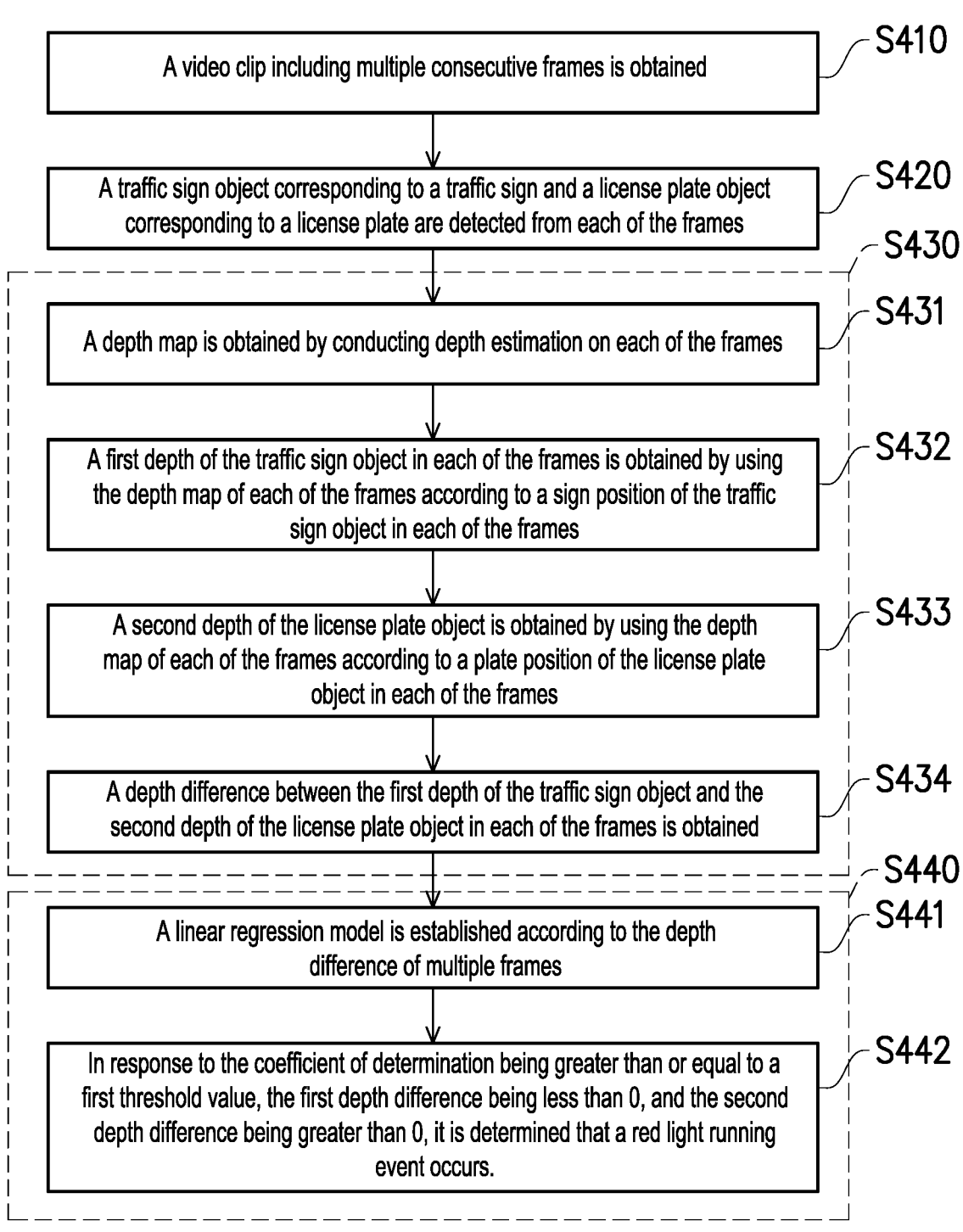

A video clip including multiple consecutive frames is obtained — S410

A traffic sign object corresponding to a traffic sign and a license plate object corresponding to a license plate are detected from each of the frames — S420

S430

A depth map is obtained by conducting depth estimation on each of the frames — S431

A first depth of the traffic sign object in each of the frames is obtained by using the depth map of each of the frames according to a sign position of the traffic sign object in each of the frames — S432

A second depth of the license plate object is obtained by using the depth map of each of the frames according to a plate position of the license plate object in each of the frames — S433

A depth difference between the first depth of the traffic sign object and the second depth of the license plate object in each of the frames is obtained — S434

S440

A linear regression model is established according to the depth difference of multiple frames — S441

In response to the coefficient of determination being greater than or equal to a first threshold value, the first depth difference being less than 0, and the second depth difference being greater than 0, it is determined that a red light running event occurs. — S442

FIG. 4

VEHICLE VIOLATION DETECTION METHOD AND VEHICLE VIOLATION DETECTION SYSTEM

CROSS-REFERENCE TO RELATED APPLICATION

This application claims the priority benefit of Taiwan application serial no. 112141398, filed on Oct. 27, 2023. The entirety of the above-mentioned patent application is hereby incorporated by reference herein and made a part of this specification.

BACKGROUND

Technical Field

The disclosure relates to a traffic violation detection method, and in particular relates to a vehicle violation detection method and a vehicle violation detection system.

Description of Related Art

Failure to adhere to traffic regulations significantly increases the likelihood of traffic accidents, leading to casualties and financial losses. Therefore, the detection of traffic violations caused by driving in violation of traffic regulations is one of the important issues in current traffic safety. Additionally, as the number of cases reported by the general public increases, law enforcement departments need to devote significant time and human resources to processing videos and determining whether there are vehicle violations. In order to effectively mitigate the harm caused by traffic violations, penalizing those who fail to comply with traffic regulations may effectively reduce the number of vehicle violation events.

In recent years, deep learning technology has been widely explored and applied in various computer vision applications, including advanced driving assistance systems, smart monitoring systems, and visual recognition systems. Based on the capabilities of current technology, various objects on the street, such as buses, motor vehicles, passengers, and traffic lights, may be detected and recognized through deep learning models. Based on this, how to analyze the object recognition results of the deep learning model to detect vehicle violation events is an issue worthy of discussion.

SUMMARY

In view of this, a vehicle violation detection method and a vehicle violation detection system, which may effectively detect whether a vehicle violation event occurs in a video clip, are provided in the disclosure.

An embodiment of the disclosure provides a vehicle violation detection method, which includes the following operation. A video clip including multiple consecutive frames is obtained, in which the video clip is generated through photographing an intersection by an image capture device. A traffic sign object corresponding to a traffic sign and a license plate object corresponding to a license plate are detected from each of the frames. Vehicle behavior information of each of the frames is obtained according to a sign position of the traffic sign object and a plate position of the license plate object in each of the frames. It is determined whether a vehicle violation event has occurred by conducting regression analysis on the vehicle behavior information of each of the frames.

An embodiment of the disclosure provides a vehicle violation detection system, which includes a storage circuit and a processor. The processor is coupled to the storage circuit and is configured to execute the following operation. A video clip including multiple consecutive frames is obtained, in which the video clip is generated through photographing an intersection by an image capture device. A traffic sign object corresponding to a traffic sign and a license plate object corresponding to a license plate are detected from each of the frames. Vehicle behavior information of each of the frames is obtained according to a sign position of the traffic sign object and a plate position of the license plate object in each of the frames. It is determined whether a vehicle violation event has occurred by conducting regression analysis on the vehicle behavior information of each of the frames.

Based on the above, in the embodiments of the disclosure, after object recognition is performed on multiple frames, vehicle behavior information may be obtained according to the position of the license plate object and the position of the traffic sign object. Vehicle violations in video clips may be detected by conducting regression analysis on the vehicle behavior information from multiple frames, thus reducing human resource expenditure. Based on this, law enforcement agencies may handle subsequent violations more efficiently.

In order to make the above-mentioned features and advantages of the disclosure comprehensible, embodiments accompanied with drawings are described in detail below.

BRIEF DESCRIPTION OF THE DRAWINGS

FIG. 2 is a flowchart of a vehicle violation detection method according to an embodiment of the disclosure.

FIG. 4 is a flowchart of a vehicle violation detection method according to an embodiment of the disclosure.

DETAILED DESCRIPTION OF DISCLOSED EMBODIMENTS

A portion of the embodiments of the disclosure will be described in detail with reference to the accompanying drawings. Element symbol referenced in the following description will be regarded as the same or similar element when the same element symbol appears in different drawings. These examples are only a portion of the disclosure and do not disclose all possible embodiments of the disclosure. More precisely, these embodiments are only examples of the method and system within the scope of the patent application of the disclosure.

Figure 1:
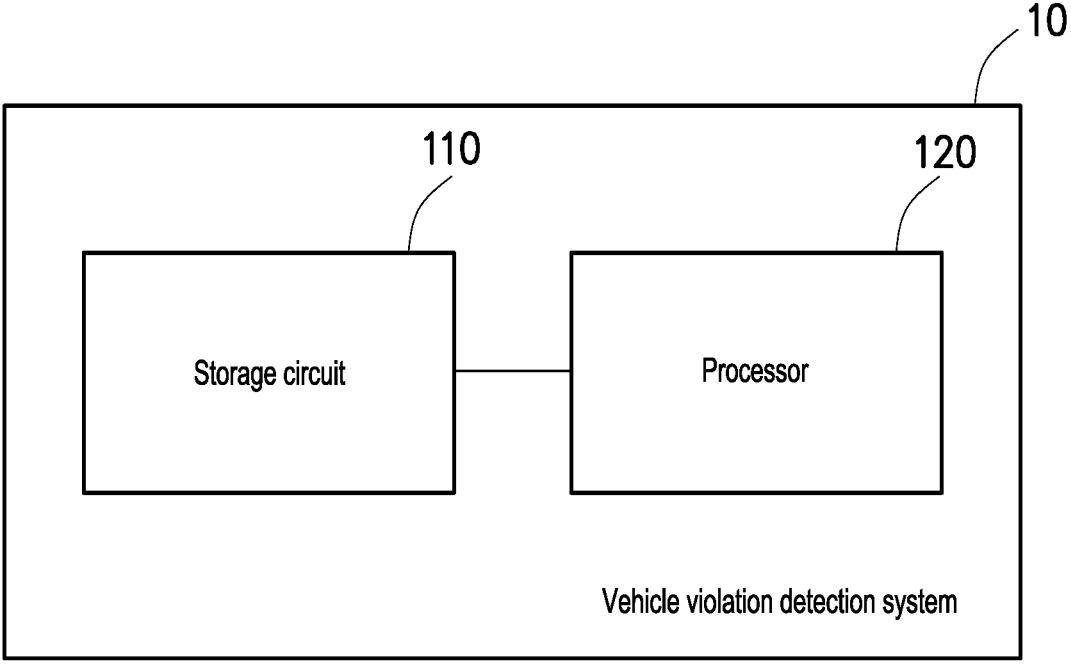
FIG. 1 is a schematic diagram of a vehicle violation detection system according to an embodiment of the disclosure.

FIG. 1 is a schematic diagram of a vehicle violation detection system according to an embodiment of the disclosure. The vehicle violation detection system 10 includes a storage circuit 110 and a processor 120. The vehicle violation detection system 10 may be implemented as one or more computer devices with computing capabilities. In different embodiments, the vehicle violation detection system 10 is, for example, various computer devices and/or server devices, but not limited thereto.

The storage circuit 110 is configured to store data and various program codes or various commands accessed by the processor 120, which may be, for example, any type of fixed or movable random access memory (RAM), read-only memory (ROM), flash memory, or a combination thereof.

The processor 120 is coupled to the storage circuit 110, in which the processor 120 can, for example, a central processing unit (CPU), an application processor (AP), or other programmable general-purpose or special-purpose microprocessor, a digital signal processor (DSP), an image signal processor (ISP), a graphics processing unit (GPU) or other similar devices, integrated circuits, and combinations thereof. The processor 120 may access and execute commands, program codes, or software modules recorded in the storage circuit 110 to implement the vehicle violation detection method in the embodiment of the disclosure.

In this embodiment, the storage circuit 110 of the vehicle violation detection system 10 stores multiple program code segments, and the above program code segments are executed by the processor 120 after being loaded. For example, the storage circuit 110 records multiple modules, and each operation applied in the vehicle violation detection system 10 is respectively executed by these modules, in which each module is formed of one or more program code segments. However, the disclosure is not limited thereto, and various operations of the vehicle violation detection system 10 may also be implemented in other hardware forms.

FIG. 2 is a flowchart of a vehicle violation detection method according to an embodiment of the disclosure. Referring to FIG. 1 and FIG. 2, the method of this embodiment is adapted for the vehicle violation detection system 10 in the aforementioned embodiment, and the following in combination with various elements in the vehicle violation detection system 10 describes the detailed steps of the method for improving image quality of this embodiment.

In step S210, the processor 120 obtains a video clip including multiple consecutive frames. The video clip is generated through photographing an intersection by an image capture device. The image capture device is, for example, an intersection monitor, a handheld electronic device, or a dash cam installed on a mobile carrier or a helmet, but not limited to this. The video clip includes multiple consecutive frames corresponding to different time points. That is, each frame may correspond to a unique frame index or timestamp. In an embodiment of the disclosure, the processor 120 may detect whether there is a traffic violation event of not obeying the traffic sign by analyzing the video clips photographed at the intersection.

In step S220, the processor 120 detects a traffic sign object corresponding to a traffic sign and a license plate object corresponding to a license plate from each frame. More specifically, the processor 120 may respectively detect multiple traffic sign objects corresponding to the same traffic sign and multiple license plate objects corresponding to the same license plate in multiple frames. In some embodiments, the traffic sign is a traffic light. The above-mentioned license plates may belong to various vehicles, such as motorcycles, cars, or buses, etc.

In some embodiments, the processor 120 may detect a traffic sign object corresponding to a traffic sign and a license plate object corresponding to a license plate by using a trained deep learning model to conduct object detection on these frames. More specifically, a deep learning model may detect an image object (i.e., a traffic sign object and a license plate object) from the frame and output the position information and the object type of the image object within the frame by inputting a certain frame into a trained deep learning model. In the embodiment of the disclosure, the above-mentioned deep learning model may be an object detection model configured for object detection in a convolutional neural network (CNN) model, such as R-CNN, Fast R-CNN, Faster R-CNN, YOLO, or SSD, etc., the disclosure is not limited thereto.

In some embodiments, the processor 120 may detect multiple traffic sign objects corresponding to different traffic signs and multiple license plate objects corresponding to different license plates from each frame (i.e., a single frame) by using the object detection model. More specifically, the processor 120 may detect multiple traffic sign objects $$L_i^t$$

and multiple license plate objects $$P_j^t$$

from multiple frames.

Herein, t represents the frame index or timestamp; i represents the traffic sign index;

$$L_i^t$$

represents the i-th traffic sign object in the t-th frame;

$$P_j^t$$

represents the j-th license plate object in the t-th frame; j represents the license plate index. In addition, in order to facilitate the explanation of the principle of this disclosure, $$L_i^t \text{ and } P_j^t$$

may also represent the sign position and the plate position.

In some embodiments, the processor 120 may distinguish multiple license plate objects corresponding to different license plates by using an image object tracking algorithm to track license plate objects in multiple consecutive frames. The above image object tracking algorithm includes the use of a Kalman filter, but not limited thereto. The processor 120 may obtain multiple license plate objects of the same license plate in different frames, and assign the same license plate index to multiple license plate objects corresponding to the same license plate in multiple frames through the application of the image object tracking algorithm. For details on using image object tracking algorithms, please refer to relevant technical literature (e.g., N. Wojke, A. Bewley, and D. Paulus, "Simple online and real-time tracking with a deep association metric," 2017 IEEE international conference on image processing (ICIP). IEEE, 2017, but not limited thereto), and are not repeated herein.

In some embodiments, in each frame, the depth value of the traffic sign object corresponding to a traffic sign (i.e., a traffic sign for detecting a vehicle violation event) is less than the depth value of other traffic sign objects corresponding to other traffic signs. Specifically, when the processor 120 detects multiple traffic sign objects corresponding to different traffic signs from each frame (i.e., a single frame), the processor 120 may select a traffic sign object for detecting traffic violation events according to the depth values of all traffic sign objects.

For example, the traffic sign object $$L_*^t$$

corresponding to the traffic sign (i.e., a traffic sign for detecting a vehicle violation event) may be represented by the following Formula (1).

$$L_*^t = \mathrm{argmin}_{L_i^t} D(L_i^t) \qquad \text{Formula (1)}$$

$$D(L_i^t)$$

represents the calculation of the depth value of the i-th traffic sign object in the t-th frame. Referring to Formula (1), it may be seen that the processor 120 may detect vehicle violation events by referring to the traffic sign object $$L_*^t$$

closest to the traffic sign of the image capture device. Alternatively, in other embodiments, the processor 120 may also select a traffic sign object $$L_*^t$$

from multiple traffic sign objects $$L_i^t$$

for detecting traffic violation events based on other selection criteria.

In addition, in some embodiments, the traffic sign configured to detect vehicle violations includes a traffic light, and the traffic light in the video clip is in a red light state. Furthermore, after capturing the traffic light objects from multiple frames, the processor 120 may perform red detection on the traffic light objects to determine whether the traffic light is displaying a red light state according to the quantity and distribution of the detected red pixels within the traffic light objects. When it is determined that the traffic light in the video clip is in a red light state, the processor 120 may be triggered to determine whether a vehicle violation event has occurred.

In step S230, the processor 120 obtains vehicle behavior information of each of the frames according to a sign position of the traffic sign object and a plate position of the license plate object in each of the frames. In some embodiments, the sign position and the plate position may be the pixel coordinates of the upper left corner point of the bounding box output by the deep learning model, but not limited thereto. For example, in other embodiments, the sign position and the plate position may be the pixel coordinates of the center point of the bounding box output by the deep learning model.

In some embodiments, the vehicle behavior information may include the movement trajectory information of the license plate, the spatial relative relationship between the license plate and traffic signs, and so on. In some embodiments, the processor 120 may obtain the movement trajectory information of the license plate in each frame by analyzing the plate positions of multiple license plate objects corresponding to the same license plate in multiple frames. In some embodiments, the processor 120 may obtain the true depth map of each image, and obtain the corresponding depth position based on the sign position and the plate position. Therefore, the processor 120 may obtain the spatial relative relationship between the license plate object and the traffic sign object based on the depth difference between the license plate object and the traffic sign object.

In step S240, the processor 120 determines whether a vehicle violation event has occurred by conducting regression analysis on the vehicle behavior information of each of the frames. The above-mentioned regression analysis may include linear regression analysis, Lasso regression, ridge regression, regression analysis based on machine learning algorithms, or regression analysis based on statistics, etc. Regression analysis based on machine learning algorithms may be, for example, support vector regression of a support vector machine (SVM), etc. For example, the processor 120 may conduct linear regression analysis by using the vehicle behavior information of each frame as a dependent variable and the frame index or timestamp of each frame as an independent variable. The processor 120 may determine whether the vehicle behavior information of each frame substantially shows a linear distribution by conducting linear regression analysis. In the embodiment of the disclosure, if the vehicle behavior information of each frame is substantially linearly distributed, it means that the vehicle is moving along an illegal route, and the processor 120 may determine that a vehicle violation event has occurred.

Figure 3:
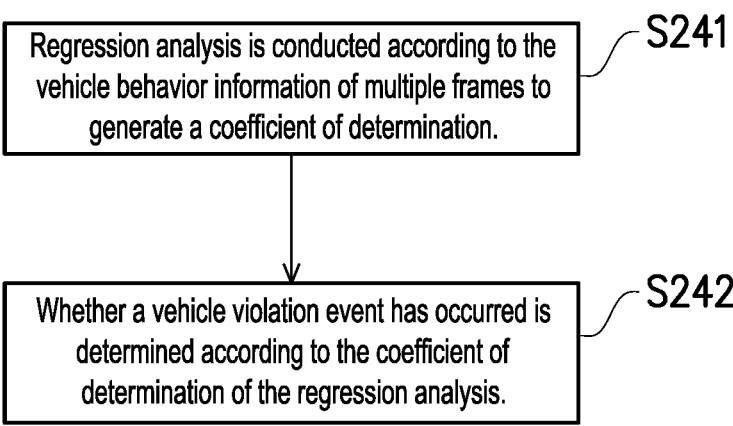
FIG. 3 is a flowchart for detecting vehicle violation events according to the vehicle behavior information of multiple frames according to an embodiment of the disclosure.

FIG. 3 is a flowchart for detecting vehicle violation events according to the vehicle behavior information of multiple frames according to an embodiment of the disclosure. Referring to FIG. 3, in this embodiment, step S240 may be implemented as step S241 to step S242. In step S241, the processor 120 conducts regression analysis according to the vehicle behavior information of multiple frames to generate a coefficient of determination. In step S241, the processor 120 determines whether a vehicle violation event occurs according to the coefficient of determination of the regression analysis. In some embodiments, the coefficient of determination may be R squared. The R squared value is a metric for measuring the performance of a regression model and represents the proportion of variation in the dependent variable that may be explained by the independent variables. The processor 120 may compare the coefficient of determination and the threshold value of the linear regression model to evaluate whether the vehicle behavior information of each frame substantially shows a linear distribution, and determine whether a vehicle violation event occurs accordingly.

In different embodiments, vehicle violation events may include red light running events and red light turning events. Correspondingly, when the vehicle violation event is a red light running event, the vehicle behavior information in each frame may include the depth difference between the plate position and the traffic sign position. In this disclosure, a red light running event refers to a vehicle proceeding straight through a red traffic sign. In addition, when the vehicle violation event is a red light turning event, the vehicle behavior information of each frame may include the movement angle generated by comparing the plate positions of adjacent frames. In this disclosure, the red light turning event refers to a vehicle making a turn during a red light. Examples are given below for clear illustration.

FIG. 4 is a flowchart of a vehicle violation detection method according to an embodiment of the disclosure. Referring to FIG. 1 and FIG. 4, the method of this embodiment is adapted for the vehicle violation detection system 10 in the aforementioned embodiment, and the following in combination with various elements in the vehicle violation detection system 10 describes the detailed steps of the method for improving image quality of this embodiment.

In step S410, the processor 120 obtains a video clip including multiple consecutive frames. In step S420, the processor 120 detects a traffic sign object corresponding to a traffic sign and a license plate object corresponding to a license plate from each frame. The above steps may be described with reference to the foregoing embodiments and are not repeated herein.

In step S430, the processor 120 obtains vehicle behavior information of each of the frames according to a sign position of the traffic sign object and a plate position of the license plate object in each of the frames. In this embodiment, step S430 may be implemented as step S431 to step S434.

In step S431, the processor 120 conducts depth estimation on each frame to obtain a depth map. Each frame has a corresponding depth map. The depth map may be formed of multiple depth values between 0 and 255. Depth estimation may be implemented using any monocular depth estimation technology known to those of ordinary skill in the art, which is not repeated herein. For example, the relevant details of calculating the depth map may be found in relevant technical literature (e.g., Z. Li, N. Snavely, "Megadepth: Learning single-view depth prediction from internet photos, in: Computer Vision and Pattern Recognition (CVPR), 2018", but not limited thereto).

In step S432, the processor 120 obtains a first depth of the traffic sign object in each of the frames by using the depth map of each of the frames according to a sign position of the traffic sign object in each of the frames. Specifically, the processor 120 may search for a first depth corresponding to the sign position of the traffic sign object from multiple depth values in the depth map. For example, assuming that the sign position of the traffic sign object is (X1, Y1), the processor 120 may use the depth value located at the coordinate position (X1, Y1) in the depth map as the first depth of the traffic sign object. The first depth is the depth information of the traffic sign object. For example, multiple first depths of multiple traffic sign objects corresponding to the same traffic sign in multiple frames may be expressed as $$D(L_*^t).$$

In step S433, the processor 120 obtains a second depth of the license plate object by using the depth map of each of the frames according to a plate position of the license plate object in each of the frames. Specifically, the processor 120 may search for a second depth corresponding to the plate position of the license plate object from multiple depth values in the depth map. For example, assuming that the plate position of the license plate object is (X2, Y2), the processor 120 may use the depth value located at the coordinate position (X2, Y2) in the depth map as the second depth of the license plate object. The second depth is the depth information of the license plate object. For example, multiple second depths of multiple license plate objects corresponding to the same license plate in multiple frames may be expressed as $$D(P_j^t).$$

In step S434, the processor 120 obtains a depth difference between the first depth of the traffic sign object and the second depth of the license plate object in each of the frames. In a situation where the image capture device is moving while photographing, since the license plate and traffic sign in the video clip are both moving, the processor 120 detects the vehicle violation event by using the traffic sign object $$L_*^t$$

of the traffic sign closest to the image capture device. Each frame may correspond to a depth difference. In some embodiments, the depth difference of each frame may be represented by the following Formula (2).

$$\Delta D_{P_j}^t = D(P_j^t) - D(L_*^t) \qquad \text{Formula (2)}$$

$$\Delta D_{P_j}^t$$

represents the depth difference between the second depth $$D(P_j^t)$$

of the j-th license plate object in the t-th frame and the first depth $$D(L_*^t)$$

of the traffic sign object $$L_*^t$$

in the t-th frame.

In step S440, the processor 120 determines whether a vehicle violation event has occurred by conducting linear regression analysis on the vehicle behavior information of each of the frames. In this embodiment, step S440 may be implemented as step S441 to step S442.

In step S441, the processor 120 establishes a linear regression model according to the depth difference of multiple frames. This linear regression model is established based on multiple depth differences of multiple frames. Specifically, the processor 120 may establish a linear regression model by using the depth difference of each frame as a dependent variable and the frame index or timestamp of each frame as an independent variable. In some embodiments, based on Formula (2), the establishment of the linear regression model may be represented by the following Formula (3).

$$(a_d, b_d) = \operatorname{argmin}_{a,b}\left(\Delta D^t_{P_j} - (at + b)\right)^2 \qquad \text{Formula (3)}$$

$a_d$ represents the linear coefficient of the linear regression model, and $b_d$ represents the constant of the linear regression model.

Based on the above, the R squared value $$R^2_{RLR}$$

of the linear regression model may be represented by the following Formula (4).

$$R^2_{RLR} = 1 - \frac{\sum_{\forall t}\left(\Delta D^t_{P_j} - (a_d t + b_d)\right)^2}{\sum_{\forall t}\left(\Delta D^t_{P_j} - \mu_{\Delta D_{P_j}}\right)^2} \qquad \text{Formula (4)}$$

$$\mu_{\Delta D_{P_j}}$$

represents the average value of $$\Delta D^t_{P_j}$$

within a period $[t_s, t_e]$.

In step S442, in response to the coefficient of determination being greater than or equal to a first threshold value, the first depth difference being less than 0, and the second depth difference being greater than 0, the processor 120 determines that a red light running event occurs. On the contrary, in response to the coefficient of determination being less than the first threshold value, the first depth difference not being less than 0, or the second depth difference not being greater than 0, the processor 120 may determine that a red light running event did not occur.

In detail, the processor 120 may determine whether $$R^2_{RLR}$$

is greater than or equal to the first threshold value TRLR to evaluate whether these depth differences $$\Delta D^t_{P_j}$$

are substantially increasing linearly. In addition, multiple depth differences of the multiple frames include a first depth difference $$\Delta D^{t_s}_{P_j}$$

corresponding to an earlier reference time and a second depth difference $$\Delta D^{t_e}_{P_j}$$

corresponding to a later reference time. The processor 120 also determines whether the first depth difference $$\Delta D^{t_s}_{P_j}$$

is less than 0, and determines whether the second depth difference $$\Delta D^{t_e}_{P_j}$$

is greater than 0. When the R squared value $$R^2_{RLR}$$

of the linear regression model is greater than or equal to the first threshold value TRLR, the first depth difference $$\Delta D^{t_s}_{P_j}$$

is less than 0, and the second depth difference $$\Delta D^{t_e}_{P_j}$$

is greater than 0, the processor 120 may determine that a red light running event occurs. Otherwise, the processor 120 may determine that the red light running event did not occur.

Figure 5:
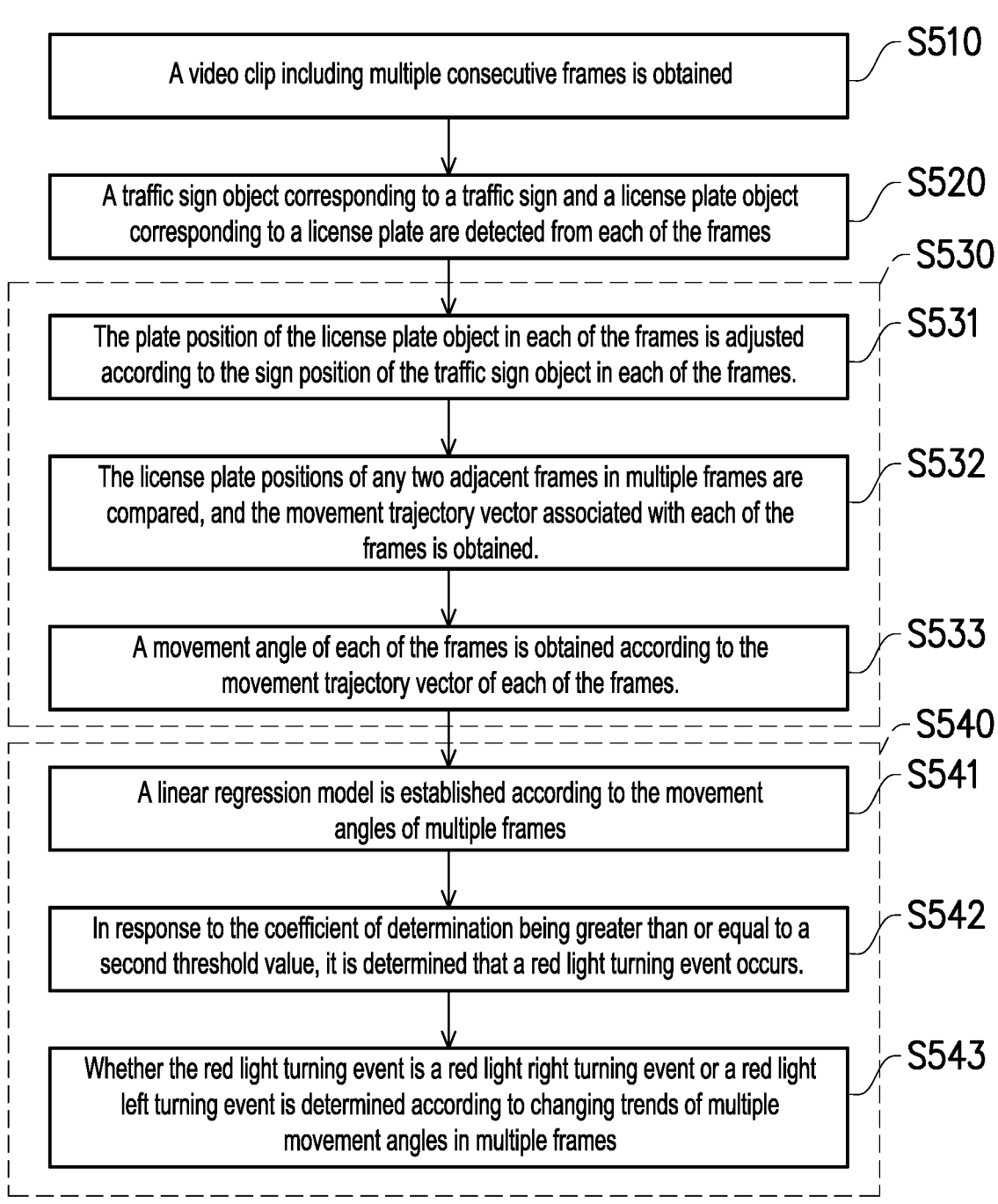
FIG. 5 is a flowchart of a vehicle violation detection method according to an embodiment of the disclosure.

FIG. 5 is a flowchart of a vehicle violation detection method according to an embodiment of the disclosure. Referring to FIG. 1 and FIG. 5, the method of this embodiment is adapted for the vehicle violation detection system 10 in the aforementioned embodiment, and the following in combination with various elements in the vehicle violation detection system 10 describes the detailed steps of the method for improving image quality of this embodiment.

In step S510, the processor 120 obtains a video clip including multiple consecutive frames. In step S520, the processor 120 detects a traffic sign object corresponding to a traffic sign and a license plate object corresponding to a license plate from each frame. The above steps may be described with reference to the foregoing embodiments and are not repeated herein.

In step S530, the processor 120 obtains vehicle behavior information of each of the frames according to a sign position of the traffic sign object and a plate position of the license plate object in each of the frames. In this embodiment, step S530 may be implemented as step S531 to step S533.

In step S531, the processor 120 adjusts the plate position of the license plate object in each of the frames by using the sign position of the traffic sign object in each of the frames as an adjustment basis. Specifically, when the image capture device photographs video clips while moving, the movement of the image capture device has an uncertain influence on the trajectory detection of the license plate. Therefore, since the sign position of the traffic sign object may reflect the movement state of the image capture device, the processor 120 may adjust the plate position of the license plate object by using the sign position of the traffic signal object to eliminate the influence of the movement of the image capture device on the trajectory detection of the license plate. In some embodiments, the processor 120 may obtain the adjusted plate position by subtracting the sign position from the plate position in each frame.

In step S532, the processor 120 compares the plate positions of any two adjacent frames in multiple frames, and the movement trajectory vector associated with each of the frames is obtained. Specifically, the processor 120 may obtain the movement trajectory vector of the t-th frame by subtracting the plate position in the t-th frame from the plate position in the t+1th frame.

In step S533, the processor 120 obtains a movement angle of each of the frames according to the movement trajectory vector of each of the frames. For example, the processor 120 may calculate the included angle between the movement trajectory vector and a horizontal vector to obtain the movement angle. The processor 120 may obtain the movement angle $$\theta^t_{P_j}$$

corresponding to each frame by repeatedly conducting similar movement trajectory recognition processing on each frame.

Figure 6A:
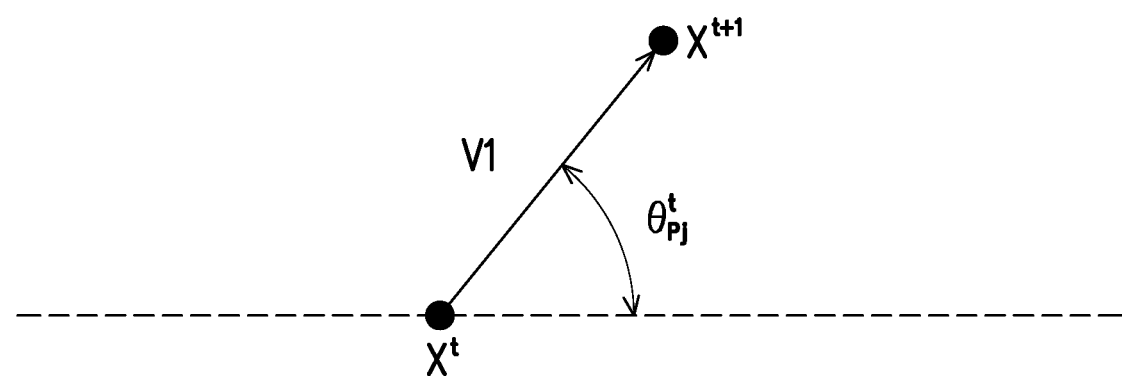
FIG. 6A and FIG. 6B are schematic diagrams of movement trajectory vectors and movement angles according to an embodiment of the disclosure.
Figure 6B:
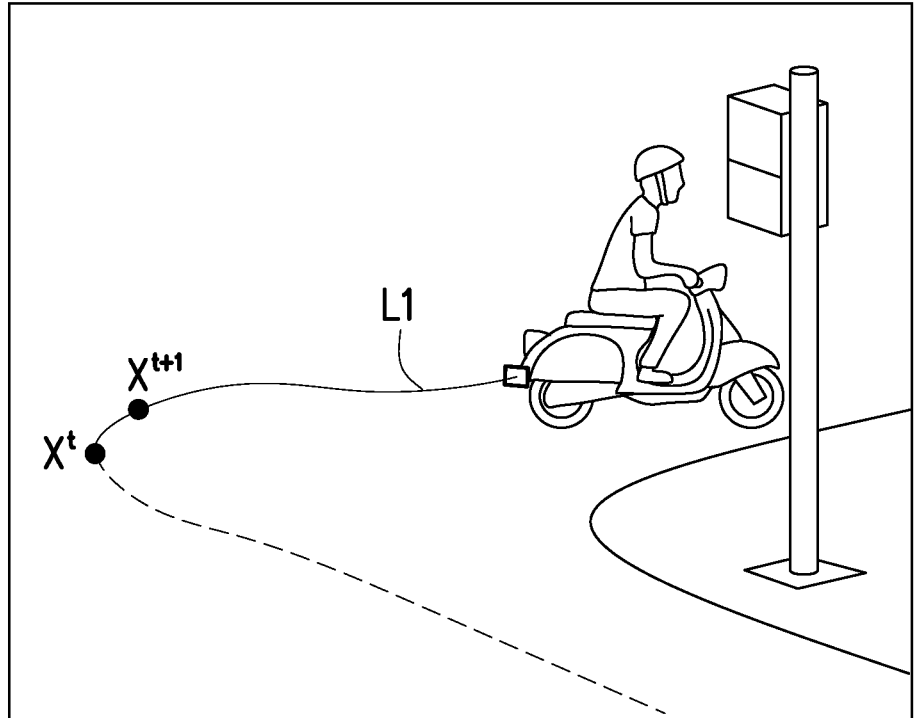

Referring to FIG. 6A and FIG. 6B, FIG. 6A and FIG. 6B are schematic diagrams of movement trajectory vectors and movement angles according to an embodiment of the disclosure. According to the foregoing, the processor 120 may detect the movement trajectory L1 of the license plate. The movement trajectory L1 is formed of multiple plate positions corresponding to multiple frames, for example, the plate position $X^t$ corresponding to the t-th frame and the plate position $X^{t+1}$ corresponding to the t+1-th frame. The processor 120 may obtain the movement trajectory vector V1 by subtracting the plate position $X^{t+1}$ of the t+1-th frame from the plate position $X^t$ of the t-th frame. Next, the processor 120 may calculate the included angle between the movement trajectory vector V1 and the horizontal vector to obtain the movement angle $$\theta^t_{P_j}.$$

In step S540, the processor 120 determines whether a vehicle violation event has occurred by conducting linear regression analysis on the vehicle behavior information of each of the frames. In this embodiment, step S540 may be implemented as step S541 to step S543.

In step S541, the processor 120 establishes a linear regression model according to the movement angles of multiple frames. Specifically, the processor 120 may establish a linear regression model by using the movement angle of each frame as a dependent variable and the frame index or timestamp of each frame as an independent variable. In some embodiments, the establishment of the linear regression model may be represented by the following Formula (5).

$$(a_\theta, b_\theta) = \mathrm{argmin}_{a,b}\left(\theta^t_{P_j} - (at + b)\right)^2 \qquad \text{Formula (5)}$$

$a_\theta$ represents the linear coefficient of the linear regression model, and $b_\theta$ represents the constant of the linear regression model. Furthermore, the processor 120 may calculate the R squared value $$R^2_{TRL}$$

of the linear regression model established by Formula (5). For the calculation method, reference may be made to the foregoing description.

In step S542, in response to the coefficient of determination being greater than or equal to a second threshold value, the processor 120 determines that a red light turning event occurs. In response to the coefficient of determination being less than the second threshold value, the processor 120 determines that the red light turning event does not occur. In detail, the processor 120 may determine whether $$R^2_{TRL}$$

is greater than or equal to the second threshold $T_{TRL}$ to evaluate whether these movement angles $$\theta^t_{P_j}$$

are substantially linearly increasing or linearly decreasing. When the R squared value $$R^2_{TRL}$$

of the linear regression model is greater than or equal to the second threshold value $T_{TRL}$, the processor 120 may determine that a red light turning event occurs. Otherwise, the processor 120 may determine that the red light turning event did not occur.

In addition, in step S543, the processor 120 determines whether the red light turning event is a red light right turning event or a red light left turning event according to changing trends of multiple movement angles in multiple frames. In some embodiments, the changing trend of multiple movement angles $$\theta'_{P_j}$$

of multiple frames may be known from the positive or negative sign of the linear coefficient $a_\theta$ of the linear regression model. When the linear coefficient $a_\theta$ of the linear regression model is positive, it represents that the multiple movement angles $$\theta'_{P_j}$$

of multiple frames substantially show a linear increase. When the linear coefficient $a_\theta$ of the linear regression model is negative, it represents that the multiple movement angles $$\theta'_{P_j}$$

of multiple frames substantially show a linear decrease. Based on this, when the linear coefficient $a_\theta$ of the linear regression model is a positive number (i.e., $a_\theta$ is greater than 0), the processor 120 may determine that the red light turning event is a red light left turning event. When the linear coefficient $a_\theta$ of the linear regression model is a negative number (i.e., $a_\theta$ is less than 0), the processor 120 may determine that the red light turning event is a red light right turning event.

To sum up, in the embodiments of the disclosure, after object recognition is performed on multiple frames, vehicle behavior information may be obtained according to the position of the license plate object and the position of the traffic sign object. Red light running events and red light turning events in video clips may be detected by conducting linear regression analysis on the vehicle behavior information from multiple frames, thus saving human resource expenditure in reviewing these video clips. Based on this, law enforcement agencies may handle subsequent violations more efficiently.

Although the disclosure has been described in detail with reference to the above embodiments, they are not intended to limit the disclosure. Those skilled in the art should understand that it is possible to make changes and modifications without departing from the spirit and scope of the disclosure. Therefore, the protection scope of the disclosure shall be defined by the following claims.

What is claimed is:

1. A vehicle violation detection method, comprising:
obtaining a video clip comprising a plurality of consecutive frames, wherein the video clip is generated through photographing an intersection by an image capture device;
detecting a traffic sign object corresponding to a traffic sign and a license plate object corresponding to a license plate from each of the frames;
obtaining vehicle behavior information of each of the frames according to a sign position of the traffic sign object and a plate position of the license plate object in each of the frames; and
determining whether a vehicle violation event has occurred by conducting regression analysis on the vehicle behavior information of each of the frames, wherein determining whether the vehicle violation event has occurred by conducting the regression analysis on the vehicle behavior information of each of the frames comprises:
conducting the regression analysis according to the vehicle behavior information of the frames to generate a coefficient of determination; and
determining whether the vehicle violation event has occurred according to the coefficient of determination of the regression analysis,
wherein obtaining the vehicle behavior information of each of the frames according to the sign position of the traffic sign object and the plate position of the license plate object in each of the frames comprises:
conducting depth estimation on each of the frame to obtain a depth map;
obtaining a first depth of the traffic sign object in each of the frames by using the depth map of each of the frames according to the sign position of the traffic sign object in each of the frames;
obtaining a second depth of the license plate object by using the depth map of each of the frames according to the plate position of the license plate object in each of the frames; and
obtaining a depth difference between the first depth of the traffic sign object and the second depth of the license plate object in each of the frames.

2. The vehicle violation detection method according to claim 1, wherein the regression analysis comprises establishing a linear regression model according to a plurality of depth differences of the frames, the depth differences of the frames comprise a first depth difference corresponding to an earlier reference time and a second depth difference corresponding to a later reference time, and determining whether the vehicle violation event has occurred according to the coefficient of determination of the regression analysis comprises:
in response to the coefficient of determination being greater than or equal to a first threshold value, the first depth difference being less than 0, and the second depth difference being greater than 0, determining that a red light running event occurs, wherein the red light running event is a vehicle proceeding straight through a red traffic sign.

3. The vehicle violation detection method according to claim 1, wherein obtaining the vehicle behavior information of each of the frames according to the sign position of the traffic sign object and the plate position of the license plate object in each of the frames comprises:
adjusting the plate position of the license plate object in each of the frames by using the sign position of the traffic sign object in each of the frames as an adjustment basis;
comparing plate positions of any two adjacent frames in the frames, and obtaining a movement trajectory vector associated with each of the frames; and
obtaining a movement angle of each of the frames according to the movement trajectory vector of each of the frames.

4. The vehicle violation detection method according to claim 3, wherein the regression analysis comprises establishing a linear regression model according to movement angles of the frames, and determining whether the vehicle violation event has occurred according to the coefficient of determination of the linear regression model comprises:

in response to the coefficient of determination being greater than or equal to a second threshold value, determining that a red light turning event occurs.

5. The vehicle violation detection method according to claim 4, wherein in response to the coefficient of determination being greater than or equal to a second threshold value, determining that the red light turning event occurs further comprises:

determining whether the red light turning event is a red light right turning event or a red light left turning event according to changing trends of the movement angles in the frames.

6. The vehicle violation detection method according to claim 1, wherein the coefficient of determination is R squared.

7. The vehicle violation detection method according to claim 1, wherein in each of the frames, a depth value of the traffic sign object corresponding to the traffic sign is less than a depth value of other traffic sign objects corresponding to other traffic signs.

8. The vehicle violation detection method according to claim 1, wherein the traffic sign comprises a traffic light, and the traffic light in the video clip is in a red light state.

9. A vehicle violation detection system, comprising:

a storage circuit;

a processor, coupled to the storage circuit and configured to:

obtain a video clip comprising a plurality of consecutive frames, wherein the video clip is generated through photographing an intersection by an image capture device;

detect a traffic sign object corresponding to a traffic sign and a license plate object corresponding to a license plate from each of the frames;

obtain vehicle behavior information of each of the frames according to a sign position of the traffic sign object and a plate position of the license plate object in each of the frames; and determine whether a vehicle violation event has occurred by conducting regression analysis on the vehicle behavior information of each of the frames, wherein the processor is configured to:

conduct the regression analysis according to the vehicle behavior information of the frames to generate a coefficient of determination; and determine whether the vehicle violation event has occurred according to the coefficient of determination of the regression analysis, wherein the processor is configured to:

conduct depth estimation on each of the frame to obtain a depth map;

obtain a first depth of the traffic sign object in each of the frames by using the depth map of each of the frames according to the sign position of the traffic sign object in each of the frames;

obtain a second depth of the license plate object by using the depth map of each of the frames according to the plate position of the license plate object in each of the frames; and obtain a depth difference between the first depth of the traffic sign object and the second depth of the license plate object in each of the frames.

10. The vehicle violation detection system according to claim 9, wherein the regression analysis comprises establishing a linear regression model according to a plurality of depth differences of the frames, the depth differences of the frames comprise a first depth difference corresponding to an earlier reference time and a second depth difference corresponding to a later reference time, the processor is configured to:

in response to the coefficient of determination being greater than or equal to a first threshold value, the first depth difference being less than 0, and the second depth difference being greater than 0, determine that a red light running event occurs, wherein the red light running event is a vehicle proceeding straight through a red traffic sign.

11. The vehicle violation detection system according to claim 9, wherein the processor is configured to:

adjust the plate position of the license plate object in each of the frames by using the sign position of the traffic sign object in each of the frames as an adjustment basis;

compare plate positions of any two adjacent frames in the frames, and obtain a movement trajectory vector associated with each of the frames; and obtain a movement angle of each of the frames according to the movement trajectory vector of each of the frames.

12. The vehicle violation detection system according to claim 11, wherein the regression analysis comprises establishing a linear regression model according to movement angles of the frames, the processor is configured to:

in response to the coefficient of determination being greater than or equal to a second threshold value, determine that a red light turning event occurs.

13. The vehicle violation detection system according to claim 12, wherein the processor is configured to:

determine whether the red light turning event is a red light right turning event or a red light left turning event according to changing trends of the movement angles in the frames.

14. The vehicle violation detection system according to claim 9, wherein the coefficient of determination is R squared.

15. The vehicle violation detection system according to claim 9, wherein in each of the frames, a depth value of the traffic sign object corresponding to the traffic sign is less than a depth value of other traffic sign objects corresponding to other traffic signs.

16. The vehicle violation detection system according to claim 9, wherein the traffic sign comprises a traffic light, and the traffic light in the video clip is in a red light state.

* * * * *